US006358344B1

(12) United States Patent
Hunter, Jr.

(10) Patent No.: US 6,358,344 B1
(45) Date of Patent: Mar. 19, 2002

(54) SPRAY APPLICATOR FOR ROOFING AND OTHER SURFACES

(76) Inventor: John P. Hunter, Jr., 344 Country Rd. 39A, Southampton, NY (US) 11968

( * ) Notice: Subject to any disclaimer, the term of this patent is extended or adjusted under 35 U.S.C. 154(b) by 28 days.

(21) Appl. No.: 09/653,772

(22) Filed: Sep. 1, 2000

Related U.S. Application Data

(63) Continuation of application No. 09/267,755, filed on Mar. 11, 1999, now Pat. No. 6,117,256.
(60) Provisional application No. 60/030,914, filed on Nov. 14, 1996.

(51) Int. Cl.[7] ............................ B05B 1/32; B05B 3/14; B32B 5/18
(52) U.S. Cl. ......................... 156/71; 156/78; 264/46.4; 427/421
(58) Field of Search ............................ 156/71, 77, 78; 264/46.4, 273; 427/421

(56) References Cited

U.S. PATENT DOCUMENTS

| | | | | |
|---|---|---|---|---|
| 1,835,402 | A | 12/1931 | Juers | |
| 2,176,891 | A | 10/1939 | Crom | 61/63 |
| 2,770,216 | A | 11/1956 | Schock | 118/323 |
| 3,027,095 | A | 3/1962 | Paasche | 239/187 |
| 3,096,225 | A | 7/1963 | Carr | 156/38 |
| 3,411,256 | A | 11/1968 | Best | 52/408 |
| 3,548,453 | A | 12/1970 | Garis | 18/5 |
| 3,583,118 | A | 6/1971 | Lowery | 52/309 |
| 3,607,972 | A | 9/1971 | Kiles | 260/825 R |
| 3,641,720 | A | 2/1972 | Berrie | 52/122 |
| 3,667,687 | A | 6/1972 | Rivkind | 239/553.3 |
| 3,705,821 | A | 12/1972 | Breer | 117/105.3 |
| 3,741,482 | A | 6/1973 | Eliason | 239/296 |
| 3,786,965 | A | 1/1974 | James | 222/176 |
| 3,823,525 | A | 7/1974 | Bruun | 52/758 D |
| 3,867,494 | A | 2/1975 | Rood | 264/45.3 |
| 3,885,066 | A | 5/1975 | Schwenninger | 427/314 |
| 3,923,937 | A | 12/1975 | Piccioli | 264/45.7 |
| 3,954,544 | A | 5/1976 | Hooker | 156/356 |
| 3,971,184 | A | 7/1976 | Van Wagoner | 52/613 |
| 4,016,323 | A | 4/1977 | Volovsek | 428/247 |
| 4,073,998 | A | 2/1978 | O'Connor | 428/310 |
| 4,087,296 | A | 5/1978 | Hooker | 156/71 |
| 4,096,303 | A | 6/1978 | Doerfling | 428/1 |
| 4,167,151 | A | 9/1979 | Muraoka | 118/665 |
| 4,194,282 | A | 3/1980 | Byrd, Jr. | 29/451 |
| 4,209,557 | A | 6/1980 | Edwards | 427/373 |
| 4,210,098 | A | 7/1980 | Harrison | 118/317 |
| 4,244,151 | A | 1/1981 | Seem | |
| 4,282,697 | A | 8/1981 | Spielau et al. | 52/746 |
| 4,333,973 | A | 6/1982 | Bellafiore | 427/424 |
| 4,379,103 | A | 4/1983 | Doerfling | 264/45.5 |

(List continued on next page.)

FOREIGN PATENT DOCUMENTS

| | | | |
|---|---|---|---|
| AU | 294996 | 5/1967 | |
| CA | 981082 | 1/1976 | |
| GB | 813311 | 5/1959 | |
| GB | 2055326 A | 3/1981 | B32B/5/18 |

OTHER PUBLICATIONS

STEPANFOAM® Stepan Co. 1998 one Internet.
STEPANPOL® Stepan Co. 1998 one Internet.

*Primary Examiner*—Sam Chuan Yao
(74) *Attorney, Agent, or Firm*—Alfred M. Walker

(57) ABSTRACT

A method and an industrial robotic device for uniformly applying coatings at appropriate thickness and pitch upon a surface moves a spray applicator foam dispenser between two parallel tracks. The uniform application of foam at each pass is assured, by accelerating the speed of the foam dispenser at the end of each pass, by providing respective curved uphill distal ends of the tracks, so that the spray applicator foam dispenser moves up the curved distal ends and returns quickly while changing speed tilt and direction at the end of each pass.

2 Claims, 8 Drawing Sheets

U.S. PATENT DOCUMENTS

| | | | | |
|---|---|---|---|---|
| 4,474,135 | A | 10/1984 | Bellafiore | 118/305 |
| 4,486,994 | A | 12/1984 | Fisher et al. | 52/303 |
| 4,521,458 | A | 6/1985 | Nelson | 427/294 |
| 4,521,478 | A | 6/1985 | Hageman | 52/309.7 |
| 4,558,550 | A | 12/1985 | Marchais | 52/309.7 |
| 4,567,230 | A | 1/1986 | Meyer | 524/786 |
| 4,572,857 | A | 2/1986 | Bekaert | 428/117 |
| 4,630,567 | A | 12/1986 | Bambousek | 118/323 |
| 4,641,468 | A | 2/1987 | Slater | 52/309.4 |
| 4,651,494 | A | 3/1987 | Van Wagoner | 52/593 |
| 4,659,018 | A | 4/1987 | Shulman | 239/264 |
| 4,736,552 | A | 4/1988 | Ward et al. | 52/94 |
| 4,748,781 | A | 6/1988 | Wencley | 52/309 |
| 4,754,583 | A | 7/1988 | Jenn | 52/88 |
| 4,774,794 | A | 10/1988 | Grieb | 52/309.7 |
| 4,788,803 | A | 12/1988 | Seitz | 52/82 |
| 4,837,095 | A | 6/1989 | Hageman | 428/287 |
| 4,838,492 | A | 6/1989 | Berry | 239/752 |
| 4,903,446 | A | 2/1990 | Richards et al. | 52/223 R |
| 4,944,127 | A | 7/1990 | Clear | 52/309.12 |
| 4,983,426 | A | 1/1991 | Jordan | 427/407.1 |
| 5,070,670 | A | 12/1991 | Alderson | 52/410 |
| 5,072,569 | A | 12/1991 | VanTassel | 52/745 |
| 5,098,024 | A | 3/1992 | MacIntyre | 239/587.1 |
| 5,141,363 | A | 8/1992 | Stephens | 405/150.1 |
| 5,215,805 | A | 6/1993 | Pavia | 428/159 |
| 5,231,813 | A | 8/1993 | Drawdy | |
| 5,248,341 | A | 9/1993 | Berry | 118/698 |
| 5,253,461 | A | 10/1993 | Janoski | 52/408 |
| 5,269,109 | A | 12/1993 | Gulur | 52/309.9 |
| 5,279,088 | A | 1/1994 | Heydon | |
| 5,344,700 | A | 9/1994 | McGrath et al. | 428/304.4 |
| 5,381,597 | A | 1/1995 | Petrove | 29/714 |
| 5,381,638 | A | 1/1995 | Andersson | 52/592.1 |
| 5,457,917 | A | 10/1995 | Palmersten | 52/91.3 |
| 5,509,242 | A | 4/1996 | Rechsteiner et al. | 52/270 |
| 5,620,554 | A | 4/1997 | Venable | 156/496 |
| 5,670,178 | A | 9/1997 | West | 424/4 |
| 5,771,649 | A | 6/1998 | Zweig | 52/405.1 |
| 5,815,989 | A | 10/1998 | Bennenk et al. | 52/80.1 |
| 5,872,203 | A | 2/1999 | Wen | 528/66 |
| 5,921,046 | A | 7/1999 | Hammond, Jr. | 52/564 |
| 5,950,397 | A | 9/1999 | Ginn et al. | 52/742.14 |
| 5,987,835 | A | 11/1999 | Santarossa | 52/417 |
| 5,992,110 | A | 11/1999 | Clear | 52/271 |
| 6,006,480 | A | 12/1999 | Rook | 52/309.12 |
| 6,061,995 | A | 5/2000 | Menchetti | 52/794.1 |
| 6,167,624 | B1 | 1/2001 | Lanahan et al. | 29/897.32 |
| 6,193,826 | B1 | 2/2001 | Starr et al. | 156/71 |
| 6,205,728 | B1 | 3/2001 | Sutelan | 52/309.7 |

SPRAY APPLICATOR FOR ROOFING AND OTHER SURFACES

This application is a continuation of application Ser. No. 09/267,755 filed Mar. 11, 1999, now U.S. Pat. No. 6,117, 256.

This application is based in part upon Disclosure Document No. 373320 dated Mar. 8, 1995 and Provisional Patent Application, Serial No. 60/030,914, filed on Nov. 14, 1996.

FIELD OF THE INVENTION

The present invention relates to a new and useful method and industrial robotic device for applying coatings or other spray coated layers, in uniform thicknesses and at appropriate angles of pitch, in field applications, such as roofing applications or pavement applications.

BACKGROUND OF THE INVENTION

In the roofing applications, flat roofs are often made of polyurethane foam layers, which may be covered by various coatings, such as elastomeric coatings, such as silicone. It is difficult to maintain a uniform thickness when applying a foam or elastomeric material, which by its nature rises when applied to achieve a thickness above a roof base.

Furthermore, the faster that a foam applicator passes over a surface, the less volume of foam is applied, resulting in less of a thickness of the applied foam. To achieve thicker foam layers, a spray applicator is slowed down in velocity as it passes over the roof bases, so that more foam material is discharged per square unit of space of roof base being passed over by the spray applicator.

Various attempts have been made to apply foam uniformly, such as from an applicator moving at a uniform speed along a carriage track. However, at the end of each pass of an applicator over a portion of a roof base, the discharged foam is applied twice, i.e. once at the end of the pass to the edge, and again as it starts over above the previously applied foam, until the carriage can adjust to an unsprayed area.

Among prior art devices included U.S. Pat. No. 5,381,597 of Petrove which describes a wheeled robotic device for installing shingles on roofs. While it does not concern spraying of urethane foam upon a flat roof, it does describe a movable, wheeled carriage for use upon a roof.

U.S. Pat. No. 5,248,341 of Berry concerns the use of curved walls to accommodate spray paint applicators for curved surfaces, such as aircraft.

U.S. Pat. No. 5,141,363 of Stephens describes a mobile train which rides on parallel tracks for spraying the inside of a tunnel.

U.S. Pat. No. 5,098,024 of MacIntyre discloses a spray and effector which uses pivoting members to move an armature which holds a spray apparatus.

U.S. Pat. No. 4,983,426 of Jordan discloses a method for the application of an aqueous coating upon a flat roof by applying a tiecoat to a mastic coat.

U.S. Pat. No. 4,838,492 of Berry discloses a spray gun reciprocating device, wherein parallel tracks are used wherein each track is square in cross section, but further wherein each track guides a plurality of rollers thereon.

U.S. Pat. No. 4,630,567 of Bambousek discloses a spray system for automobile bodies, including a paint booth, a paint robot apparatus movable therein, and a rail mechanism for supporting the apparatus thereat.

U.S. Pat. No. 4,567,230 of Meyer describes a chemical composition for the application of a foam upon a flat roof.

U.S. Pat. No. 4,167,151 of Muraoka discloses a spray applicator wherein a discharge nozzle is moved transversally upon a frame placed adjacent and parallel to the surface having the foam being applied thereto. However, the applicator of Muraoka '151 does not solve the problem of excess foam being applied at the end of each transverse pass of the discharge nozzle.

U.S. Pat. No. 4,209,557 of Edwards describes a movable carriage for a nozzle applying adhesive to the back of a movably advancing sheet of carpeting. Similarly, Australian Patent no. 294,996 of Keith describes a movable carriage for a nozzle applying a polyurethane foam coating to a movably advancing sheet.

U.S. Pat. No. 4,016,323 of Volovsek also discloses the application of foam to a flat roof.

U.S. Pat. No. 3,786,965 and Canadian Patent no. 981,082, both of James et al, describe a self-contained trailer for environmentally containing a dispenser for uniformly dispensing urethane foam upon a terrestrial surface, wherein the problem of "skewing" occurs at the completion of each pass at the boundary edges of the surface to which are urethane foam is being applied. James '965 employs self-enclosed gantry robots to move the fluid discharge nozzle over the terrestrial surface.

U.S. Pat. No. 3,667,687 of Rivking discloses a foam applicator device.

U.S. Pat. No. 4,474,135 of Bellafiore discloses an apparatus for spraying a coating upon a spherical object supported by a post, which apparatus includes a curved track for providing orbital movement of a spray applicator about the exterior spherical surface of the sphere to be coated. While they are curved in nature, the curved tracks thereof are provided for orbital movement about the sphere, not to change the speed, tilt and direction of a linearly moving nozzle.

Another attempt to solve the problem of "double spraying" at a pass edge has been described in U.S. Pat. No. 4,333,973 of Bellafiore, which describes a similar spray applicator, such as that of Autofoam® Company. This spray applicator includes a wheeled, self-movable vehicle having a carriage portion with a horizontal linear track thereon. The spray applicator moves from one end of the track to the other, opposite end of the track at the end of one pass, of the applicator, above a portion of a roof base, and then the applicator reverses direction upon the track.

However, to avoid the "double spraying" problem noted above, the Autofoam® device has an on-off switch which turns the applicator off at an appropriate time at the end of a pass while the applicator is reversing direction, and re-starts the applicator a short time later when the applicator has started to move in the opposite direction.

Moreover, there are severe problems with this approach, as the constant "on-off" starting and re-starting of the applicator causes fatigue to the metal or other material parts of the applicator, and a detrimental effect to the end product. In addition, the Bellafiore '973 and Autofoam® devices are bulky and complicated to use.

OBJECTS OF THE INVENTION

Therefore, the objects of the present invention are as follows:

It is therefore an object of the present invention to provide a spray applicator for foam roofing which applies a coating of elastomeric foam of uniform thickness.

It is also an object of the present invention to provide a single yet efficient spray applicator for foam roofing.

It is also an object of the present invention to provide a spray applicator than can be disassembled into a few major parts for easy transport and reassembly on a roof without resorting to the use of a crane.

It is yet another object of this invention to provide a method for covering a large area of a roof with foam roofing using a continuous spray.

It is also an object of the present invention to provide a spray applicator with a nutating nozzle mount to minimize variations in coating thickness.

It is a further object of the present invention to provide a hand-held remote control to enable the spray applicator vehicle to operate without an on-board operator.

It is an object of the present invention to provide a method for continuous adhesive spraying and application of elastomeric sheet roofing material of a large strip areas of a roof.

It is a further object of the present invention to provide accessories for the spray applicator vehicle to permit its use for applying elastomeric sheet roofing material from a roll.

Yet another objective of this invention is to provide a method and apparatus to provide fabric reinforced foam roofing.

It is also an object of the present invention to improve over the disadvantages of the prior art.

SUMMARY OF THE INVENTION

In keeping with these objects and others which may become apparent, and to solve the problems inherent in the Bellafiore '973 and Autofoam® spraying devices, the present invention uses one or more track rails, such as a double linear track of round cross section, as shown in the drawings herein, wherein there is an arcuate uphill end portion of the track at each side, so that the spray applicator, which moves along the one or more linear tracks, will accelerate in speed and tilt the discharge nozzle outward as it rolls up the curved uphill portion, thereby reducing the amount of foam applied to the edge portion of the roof at the end of a pass of the applicator.

To obviate the complicated mechanisms of the Autofoam® device, the present invention uses simple mechanics to move the spray applicator. For example, a radially extending swinging arm is provided for the sideways movement of the applicator along the track. To eliminate arcuate movement of the pivoting arm, a telescoping mechanism is provided, so that the spray applicator moves linearly, instead of arcuately, as the swinging arm moves about a pivot fulcrum point.

To further insure uniform thickness, the present invention further comprises various speed controls, so that an appropriate thickness can be applied for each pass.

For example, a rheostat controls the speed of the movement of the spray applicator, and an LED readout tachometer has a display dial with appropriate readings for appropriate speeds for corresponding desired thicknesses. Since the rate of flow of foam-producing material emanating from the nozzle is fixed, the ground movement speed of the applicator determines the weight of the coating per unit area applied. This, in turn, determines the thickness.

When a slope is desired on a flat roof, such as toward a drainage line, the ground speed of the foam applicator can be reduced on each successive pass away and parallel to the drainage line. This will result in a stepwise slope approximating the desired contour.

It has been found that a nutating nozzle holder, which tilts the nozzle a small amount cyclically as it traverses the track, can be used to minimize the variations in foam thickness (in the form of rounded ridges) due to the hollow-cone pattern of the nozzle.

Accessories can be added to the spray applicator so that it can be adapted for spraying adhesive on a roof or for automatically laying an elastomeric sheet covering such as Sure-Seal™ Fleece Back 100 EPDM made by Carlisle SynTec Incorporated of Carlisle, Pa. over a polyurethane foam substrate. Accessories can also be added for imbedding reinforced fabric within the polyurethane foal substrate.

While the invention has been described for use in applying roofing materials on roofs, it is also usable for spray applications at ground level such as for pavement painting or sealing applications.

DESCRIPTION OF THE DRAWINGS

The present invention can best be described in conjunction with the accompanying drawings, in which:

FIGS. 8 and 8A show a nozzle spray pattern and resultant foam cross section;

FIGS. 9A and 9B show a nutating spray nozzle feature with details thereof; wherein FIG. 9A is a side elevation of a nozzle holder and an actuator cable; and, FIG. 9B is a top plan view of a cam and cam follower;

DETAILED DESCRIPTION OF THE PREFERRED EMBODIMENT

Figure 1:
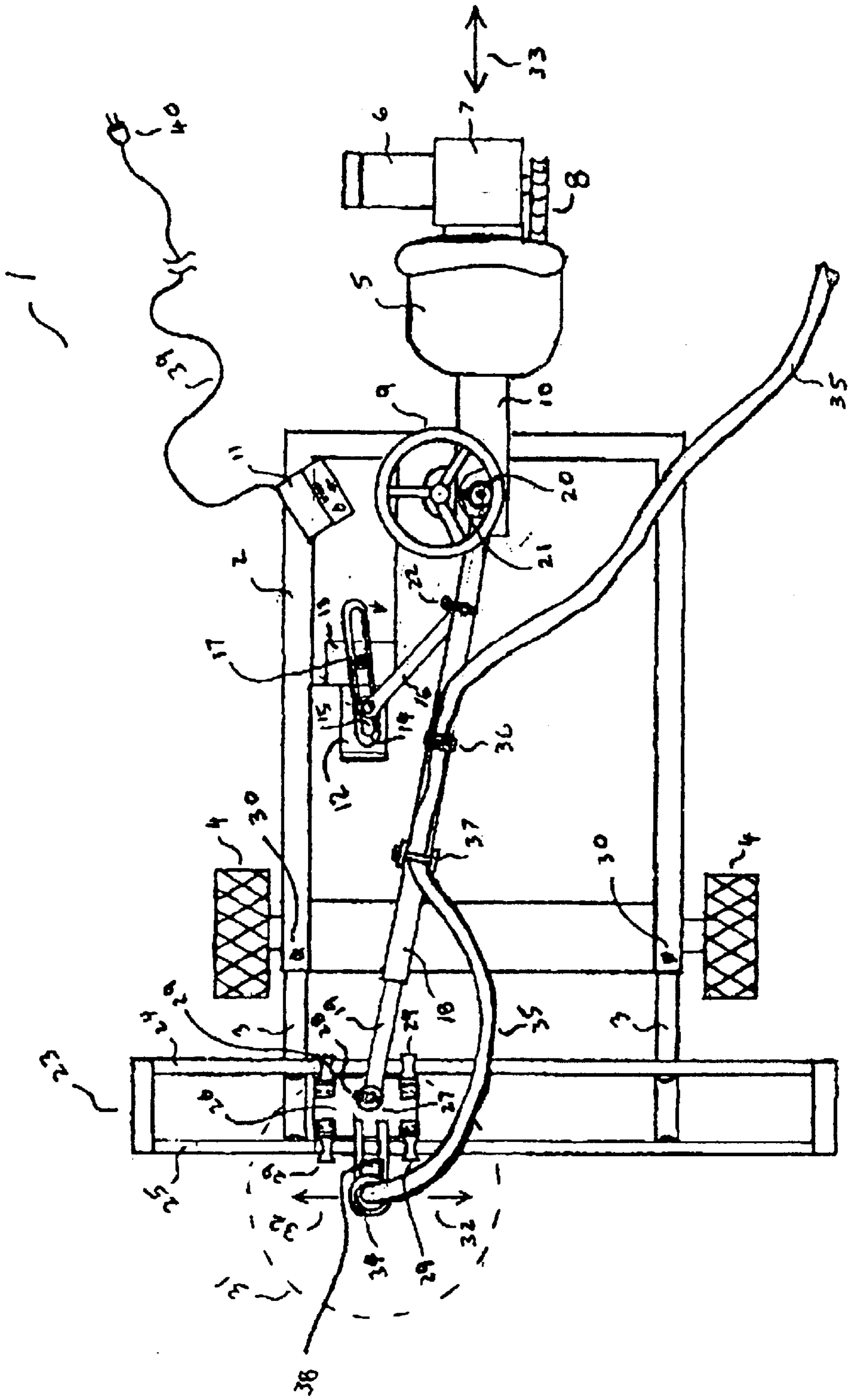
FIG. 1 is a top plan view of a spray applicator vehicle of the present invention.
Figure 2:
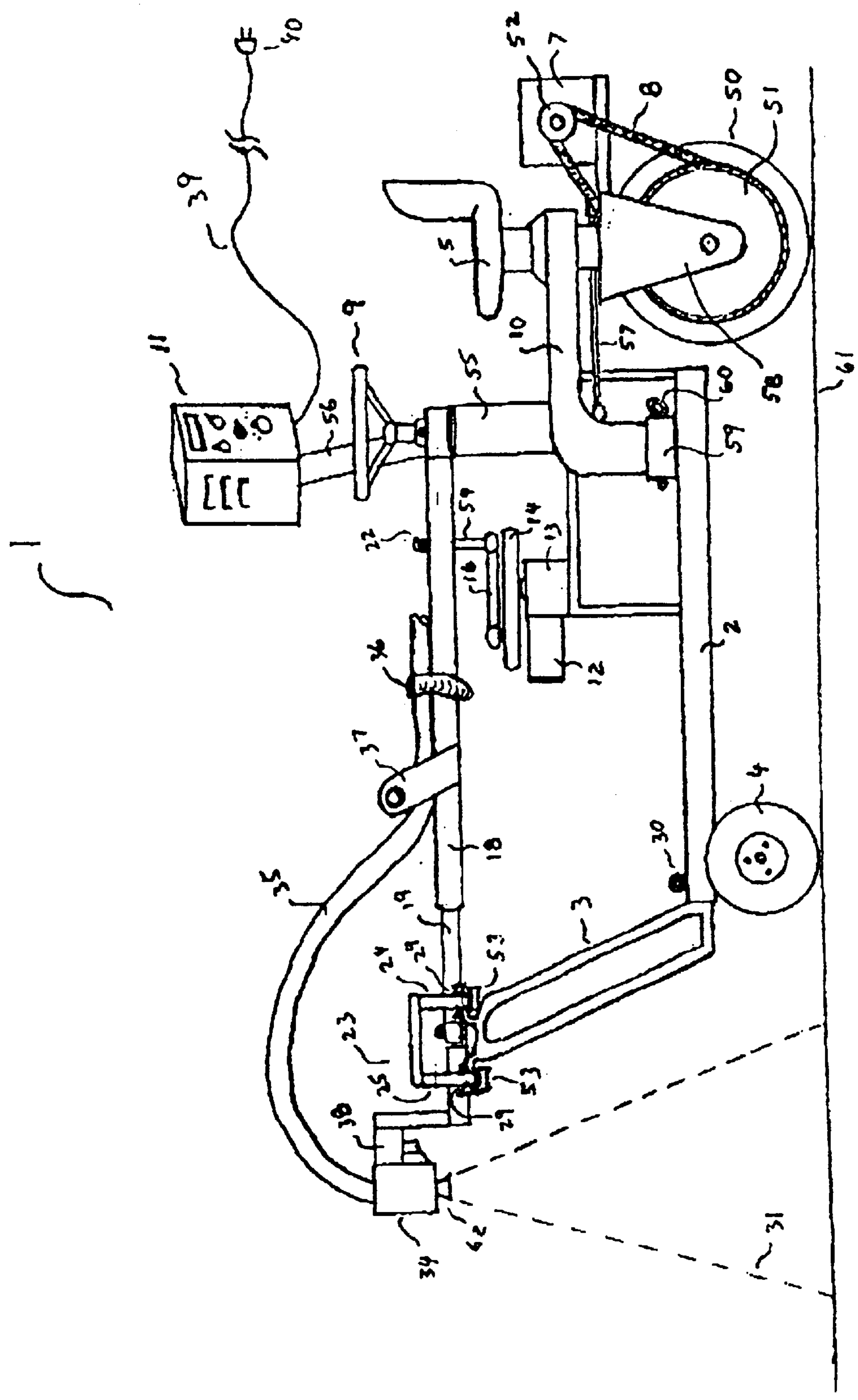
FIG. 2 is a side elevation of a spray applicator vehicle of the present invention.

As shown in FIGS. 1–2, spray applicator 1 is used for applying polyurethane foam coatings or other spray coated layers, in uniform thicknesses in field applications, such as roofing applications or pavement applications.

As shown in FIGS. 1 and 2, spray applicator vehicle 1 includes frame 2, operator seat 5, steerable powered single wheel 50, two unpowered side wheels 4, swinging boom 18, transverse rail subassembly 23 and various associated parts of nozzle 62 attached to carriage plate 26. Motor 6 drives sprocket 52 of chain 8 through gear reduction box 7 to provide vehicle motion via wheel sprocket 51. The operator steers the vehicle 1 by steering wheel 9, which moves steering linkage bar 57, thereby rotating wheel flange 58. Boom 18 is continuously reciprocated from pivot point 20 on tower 55 by crank arm 16 which is cyclically moved by reduction gear box 13 powered by motor 12, via adjustable linkage arm 14. Linkage arm 14 is attached to output shaft 17 and is rotated at a constant speed as determined by settings in control box 11. Slot 15 permits adjustment of the lateral movement limits of telescoping end 19 of boom 18. Rails 24 and 25 constrain the movement of carriage plate 26 to a linear path transverse to frame 2.

Control box 11 also sets the ground speed of vehicle 1. Hose 35, which may consist of two or more separate hoses or individual lumens, carries liquid materials for spraying through nozzle 62 from a remote pressurized source. For polyurethane foam, two chemicals supplied from separate hoses 35 are mixed at the nozzle 62 just prior to discharge. The two liquids interact chemically causing an exothermic foaming and hardening reaction. Hose 35 is retained in boom bracket 37 and may also be attached in one or more places by hook and loop straps 36. In normal use, a second (non-riding) work person guides hose 35. Solenoid 38, actuated by a switch in control unit 11, operates the discharge valve at nozzle 62.

It can be appreciated that vehicle 1 rolling at a constant speed with boom 18 reciprocating continuously is able to spray a continuous strip of coating on a surface. If the discharge rate at the nozzle is held constant, the amount of product sprayed on a surface per unit of sprayed area can be set by selecting ground speed.

Since the boom changes direction at the distal ends of its swings, a method is employed to limit the amount discharged to prevent "double coating" at the edges.

As noted before, prior art systems, such as described in Bellafoire '973 and of Autofoam® Company, shut the nozzle off at these portions of the cycle. However this action causes several problems.

For example, the on/off cycling has detrimental effects on spray material consistency from a chemical reaction point of view. The on/off cycling also causes mechanical wear and induces metal fatigue on brackets that must react to cyclic pressure loading.

In contrast to the devices of Bellafoire '973 and of the Autofoam® Company, the present invention uses a geometric arrangement and constant liquid product flow to prevent pattern edge build-up.

Figure 3:
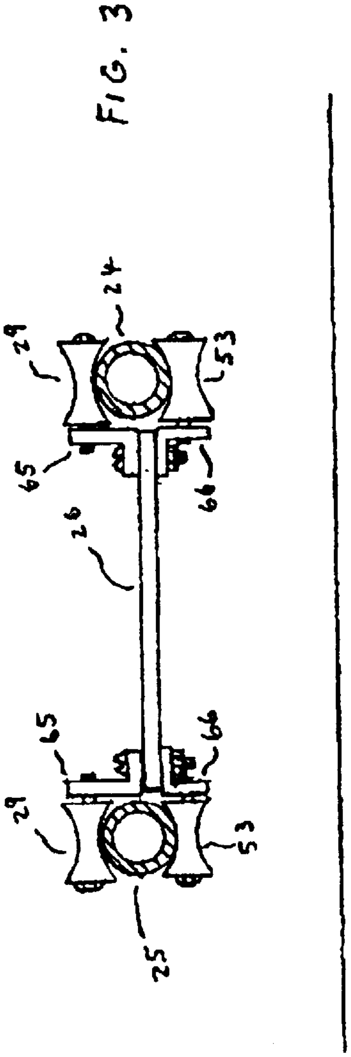
FIG. 3 is a side cross section detail of a transverse rail and carriage.

For example, FIG. 3 shows a cross section of rails 24 and 25 in the middle of the transverse sweep. Carriage plate 26, driven by end bushing 27 on telescoping extension 19, is shown with brackets 65 and 66 attached. Brackets 65 secure top rollers 29 with concave "hourglass" contours. Similarly contoured bottom rollers 53 are secured by brackets 66. Thus rollers 29 and 53 capture rails 24 and 25 constraining plate 26 to roll along these rails. Plate 26 also supports nozzle holder assembly 34 (not shown in this figure).

Figure 4:
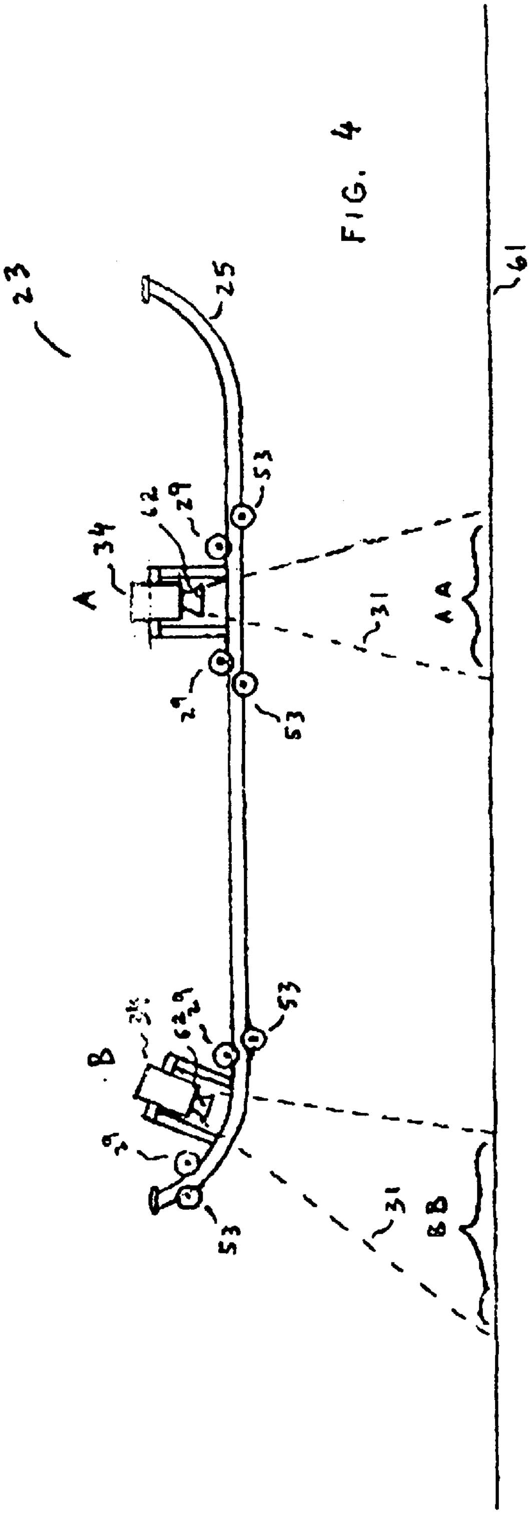
FIG. 4 is an end elevation of a transverse rail and carriage.

FIG. 4 shows an end view of rail subassembly 23. Both rails 24 and 25 are curved at their distal ends in a constant radius. Nozzle assembly 34 is shown in a flat vertical spray location at "A" and at an oblique spray location at the extreme limit of travel on the curved portion at "B". Top rollers 29 and bottom rollers 53 are offset from each other to facilitate easy rolling without binding on the curved portions. If boom 18 is reciprocated at an essentially constant rate, the carriage assembly is accelerated at the ends of travel due to the greater distance traveled per unit time on the curved end contour as well as the change in direction. Furthermore, the angle of nozzle 62 is tilted outward at the end so that the coverage area "BB" is larger than that of "AA". These end factors combine to reduce the thickness of the sprayed layer so that the "double layering" at the edge of each applied band of foam can be controlled to result in an edge thickness essentially the same as that of the center portion of a pass. This can be adjusted empirically based on the particular batch, temperature and other field conditions. The adjustment is the end limit position of nozzle 62 relative to the track end curve as determined by the adjustment of crank arm 16 in slot 15 of linkage arm 14.

Spray vehicle 1 is designed to be easily disassembled into four subassemblies for easy transport to the roof of a building on an elevator or by using a winch. Prior art systems require a crane. Booms 18 and 19 can be lifted off as a unit by removing spring pin 22 from upright link 54, spring pin 21 from pivot shaft 20 and spring pin 28 from carriage plate 26 coupling.

A front subassembly including of track subassembly 23 with uprights 3 can be removed by removing two spring pins 30 from frame member 2.

Central frame 2 subassembly including wheels 4 can be separated from the driven wheel subassembly (including seat 5 and steering wheel 9 by removing large spring pin 60 from socket member 59 on the frame subassembly. Then back chassis 10 can be lifted free. Electrical connections tying the various subassemblies have connectors which must be disconnected. The four subassemblies can then be reassembled on the rooftop.

Figure 5:
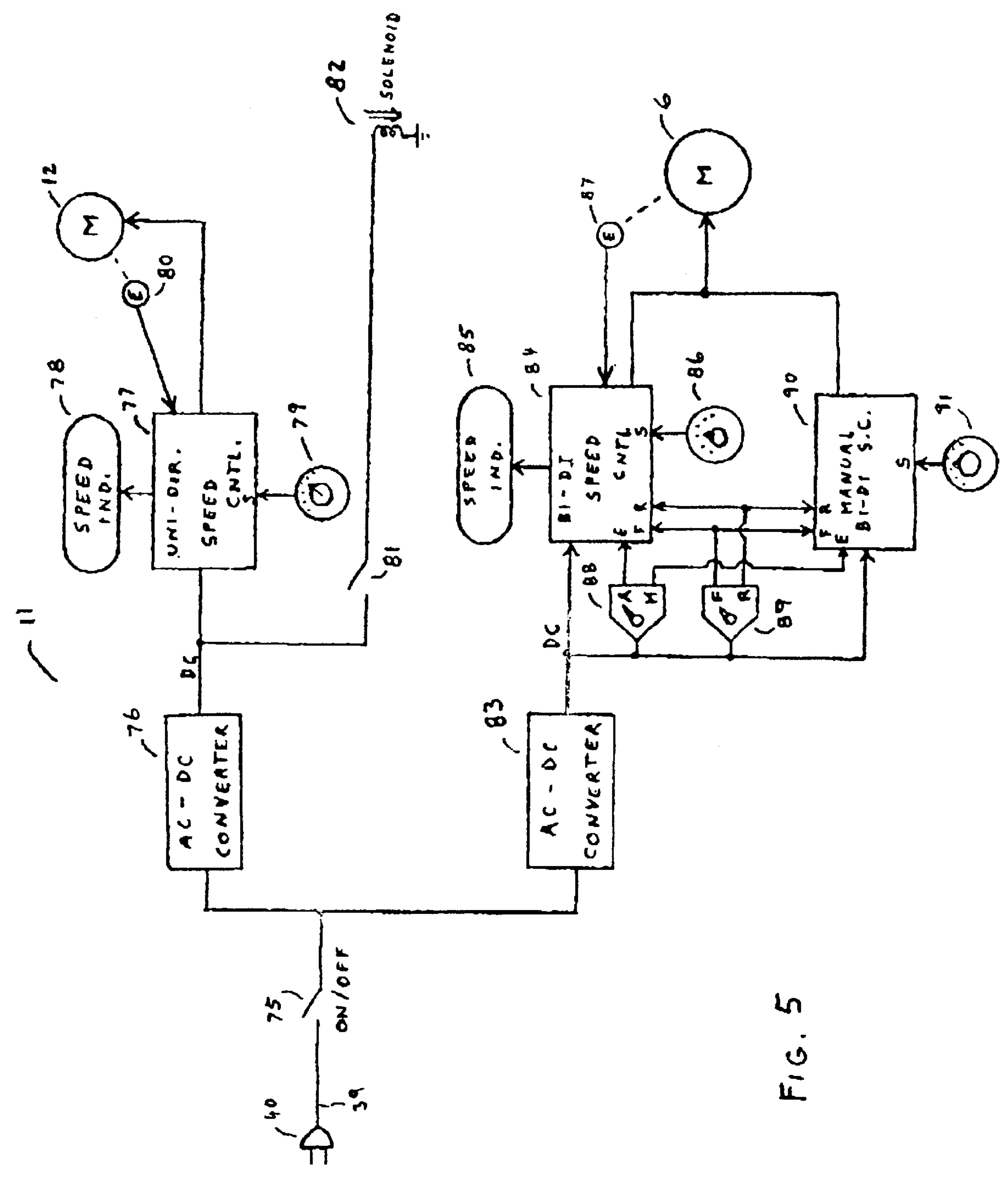
FIG. 5 is a block diagram of a spray applicator electrical system.

FIG. 5 shows a block diagram of the electrical system largely housed in control box 11. The spray applicator vehicle 1 is electrically operated by connection to standard AC mains (typically 115 VAC at 60 HZ) via plug 40 and extension cord 39. A portable engine operated generator can supply this power as an alternative. Although two separate modular AC/DC converters 76 and 83 are depicted, a single converter can supply current to all DC loads.

An AC power switch 75 controls power to the entire spray applicator vehicle 1. Converter 76 supplies DC to a unidirectional speed control 77 with digital speed indicator 78 and speed set control 79. For maximum consistency of application, speed control 77 is preferable a PID type of feedback servo control which maintains output speed of motor 12 (for swinging of boom 18) constant via feedback from encoder 80 mounted on motor 12.

Switch 81 controls power to a solenoid 82 which opens the discharge valve at nozzle 62. Converter 83 supplies DC power to a bi-directional PID speed control 84 with digital speed indicator 85 and speed set control 86. This control accurately and repeatedly maintains the ground speed in either direction of spray applicator vehicle 1 as set even under varying load conditions by virtue of feedback encoder 87 mounted on motor 6.

This operation is used during the spraying operation and determines the thickness of the resulting sprayed layer. Control switch 89 determines the direction of movement as forward or reverse.

A second manual bi-directional speed control 90 is used to quickly select the desired ground speed via alternate manual control 91 when it is desired to maneuver spray applicator vehicle 1 prior or after a spray application.

In this manner, the carefully selected "automatic" setting for spraying is not altered. Either automatic speed control 84 or manual speed control 90 is actively enable at any one time via selector switch 88.

Figure 6:
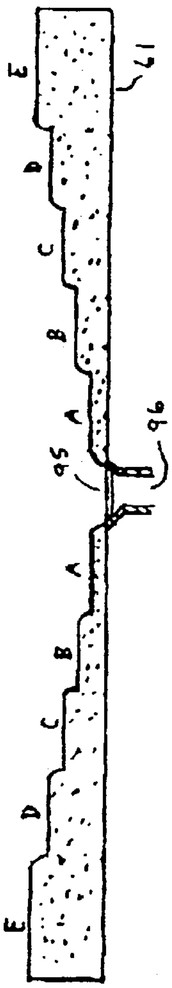
FIG. 6 is an end cross section of a coated roof with a central drain ridge.

The repeatable application of a desired amount of coating per pass permits the type of roof foam surfacing depicted in FIG. 6. This is an exaggerated cross section of the end of a roof 61 surface with a central drain 96 ditch with grate cover 95. If the roof 61 had a flat pitch, it would be desirable to create a pitch toward the drainage ditch for more effective drainage. This can be approximated by a stepped foam layer as shown, starting from lowest strip "A" and rising in thickness to strip "E" of the thickest cross section farthest from central drain 96. These strips can be applied in a single pass or in multiple passes by spray applicator vehicle 1 where the ground speed for layer "A" is fastest and the speed is reduced for each successive layer "B", "C", "D", "E" and "F".

For safety reasons, federal OSHA occupational safety regulations stipulate that a powered vehicle cannot be ridden by a workperson within ten feet of the edge of a roof. Also, a workperson is required to guide hose 35 while the operator rides and guides spray applicator vehicle 1. For these reasons, it would be desirable to operate spray applicator vehicle remotely. In this manner, a single workperson controls spray applicator vehicle 1 and guide hose 35.

Figure 7:
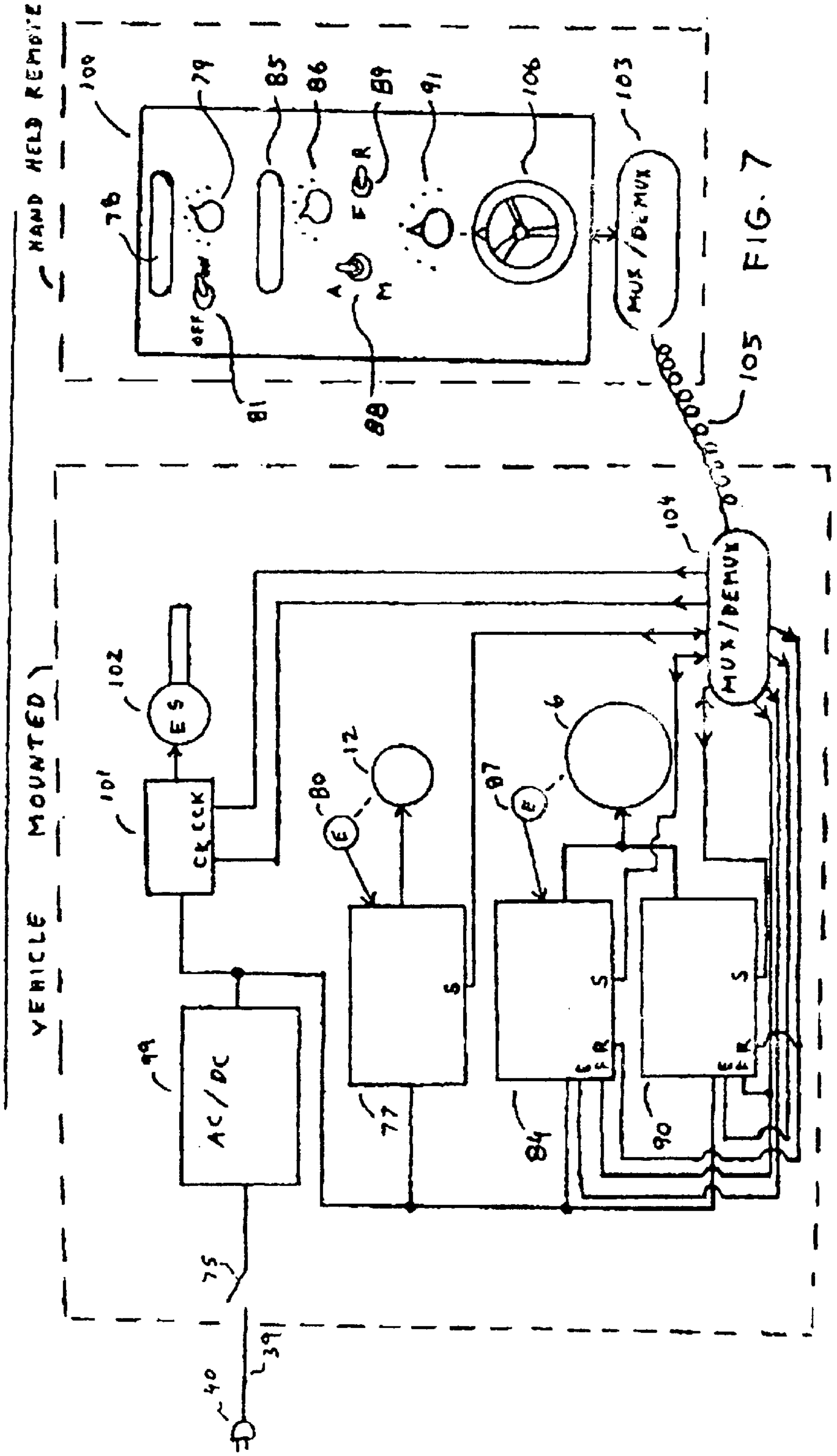
FIG. 7 is a block diagram of a spray applicator electrical system using a hand-held remote control.

FIG. 7 shows such a remote control configuration. Control box 11 is replaced by a hand-held remote control box 100 with a face plate and several vehicle mounted functional units. Since the operator is no longer physically on spray applicator vehicle 1, electric steering ram 102 replaces the steering wheel. Electric steeling ram 102 is controlled by positional steering control 101, which sets the position of steered wheel 50 to match that of steering control wheel 106 on remote control box 100.

Communications between remote control box 100 and spray applicator vehicle 1 is via coiled cable 105, although a fail-safe radio communications channel can be used as well. To limit the number of individual conductors in cable 105, a multiplexor/demultiplexor module 103 and 104 is used at each end of cable 105 to facilitate the two way communications. The function of similarly numbered components is the same as that explained above in reference to FIG. 5.

Figure 8:
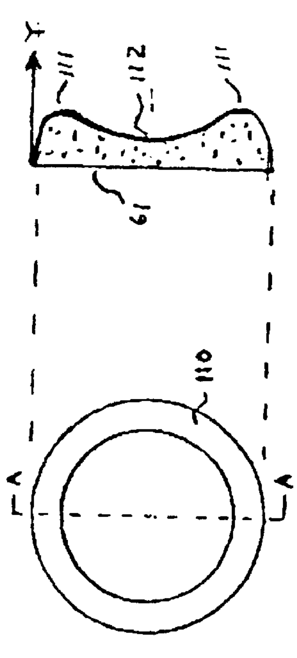

Hollow-cone nozzle 62 sprays a pattern 110 that impinges on the ground as shown in FIG. 8. As this pattern is swept sideways in a single pass, it will lay material that is denser toward the top and bottom edges resulting in a cross section with ridges 111 and valley 112 in the "Y" direction from roof surface 61.

While multiple sweeps by boom 18 mitigate this effect somewhat, ridges in the final sprayed surface still persist. This problem is eliminated by nutating or cyclically rocking the nozzle amount 34 slightly at right angles to rails 24 and 25 several times during each sweep to even out the coverage of hollow-cone nozzle 62 over multiple sweeps.

Figure 9:
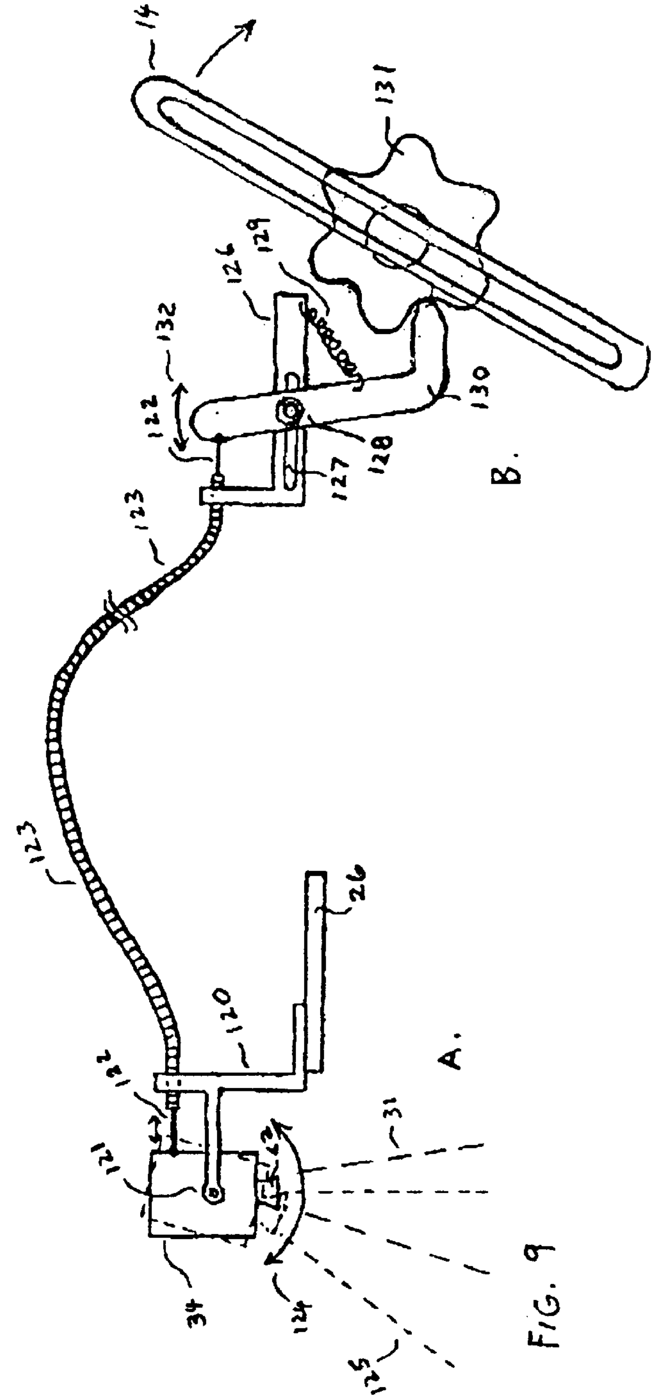

FIG. 9 shows optional modifications to accomplish this. The detail of FIG. 9A shows modified bracket 120 with pivot 121 holding nozzle mount 34. Bracket 120 is fastened to carriage plate 26. A push-pull cable assembly including armored housing sleeve 123 with cable 122 within is used to actuate the cyclic motion illustrated by the phantom representation (shown in broken lines) of nozzle holder 34 at the extreme outward position. The detail of FIG. 9B shows the powering end of cable 122. Bracket 126, attached to the frame of vehicle spray applicator 1 in the vicinity of gear box 13, retains sleeve 123. Cam follower 130 is pivoted at pivot point 128 within adjustment slot 127 and is biased toward multiple lobe cam 131 by spring 129. The stroke of wire 122 (and therefore the amount of cyclic tilt of nozzle holder 34) is determined by the dimensions and geometry of can follower 130 and the depth of lobes on multiple lobe cam 131.

The proper centering of the motion of holder 34 is adjusted by moving pivot 128 within slot 127. Multiple lobe cam 131 is attached to the output shaft of gear box 13 under arm 14. It can be appreciated that cable wire 122 is cycled by each cam lobe as multiple lobe cam rotates.

By moving cam follower 130 out of contact with multiple lobe cam 131 and tightening it in a locked position, to defeat the pivoting, nozzle holder 34 can be locked in a vertical position to defeat the nutating feature.

Alternatively, a separate small gear motor and crank coupling (not shown) mounted right on bracket 120 can be used to actuate the nutating action without need of cable 122.

Figure 10:
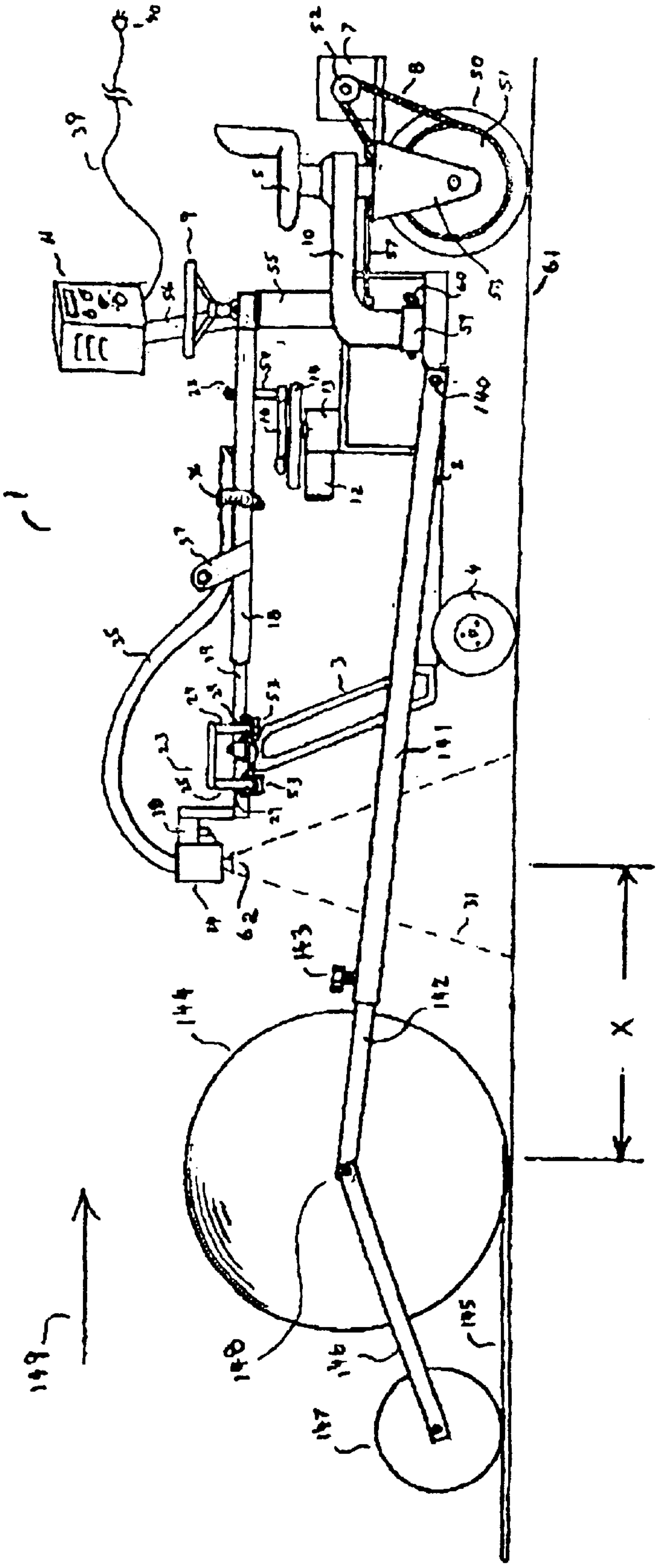
FIG. 10 is a side elevation of a spray applicator as adapted for laying elastomeric sheet roofing material; and, FIG. 11 is a side elevation of a spray application vehicle as adapted for applying fabric or mesh reinforced foam coating.

Spray applicator vehicle 1 is easily modified to adhesively bond sheet elastomeric roofing material. As shown in FIG. 10, side arms 141 are pivoted at pivot point 140 from side extensions (not shown) which are attached to frame 2. These arms 141 have telescoping extensions 142 which are locked with hand screws 143. A roll of elastomeric sheet 144 is pivoted at the end of arms 142 at pivot point 148, with sheet end 145 trailing roll 144 as vehicle spray applicator 1 moves in the direction of arrow 149. Also pivoted at pivot point 148 are side arms 146 which trail a weighted roller 147, which weighted roller 147 applies even pressure to sheet layer 145. Nozzle 62 sprays a layer of bonding adhesive which bonds sheet 145 to roof surface 61.

Alternatively, roll 144 can be adjusted to apply a skin coating of rolled material over the solidified foam layer applied from nozzle 62 to a surface, such as a roof.

Adjustment of extensions 142 determine the distance X between the sheet contact and the sprayed roof surface a fixed distance from the center of the spray cone. Since the vehicle moves at a predetermined constant speed, distance X can be used to match the optimal delay from adhesive application to contact of the sheet roofing material.

A method for applying reinforced foam roofing involves the use of a reinforcing fabric or open fabric mesh. The fabric can be manufactured of a variety of fibers such as nylon, fiberglass, aramid, etc. The method involves spraying a foaming mixture and immediately imbedding the reinforcing fabric in the mixture before the foam rises so that the reinforcing fabric rises with the foam and is embedded in the foam layer.

Figure 11:
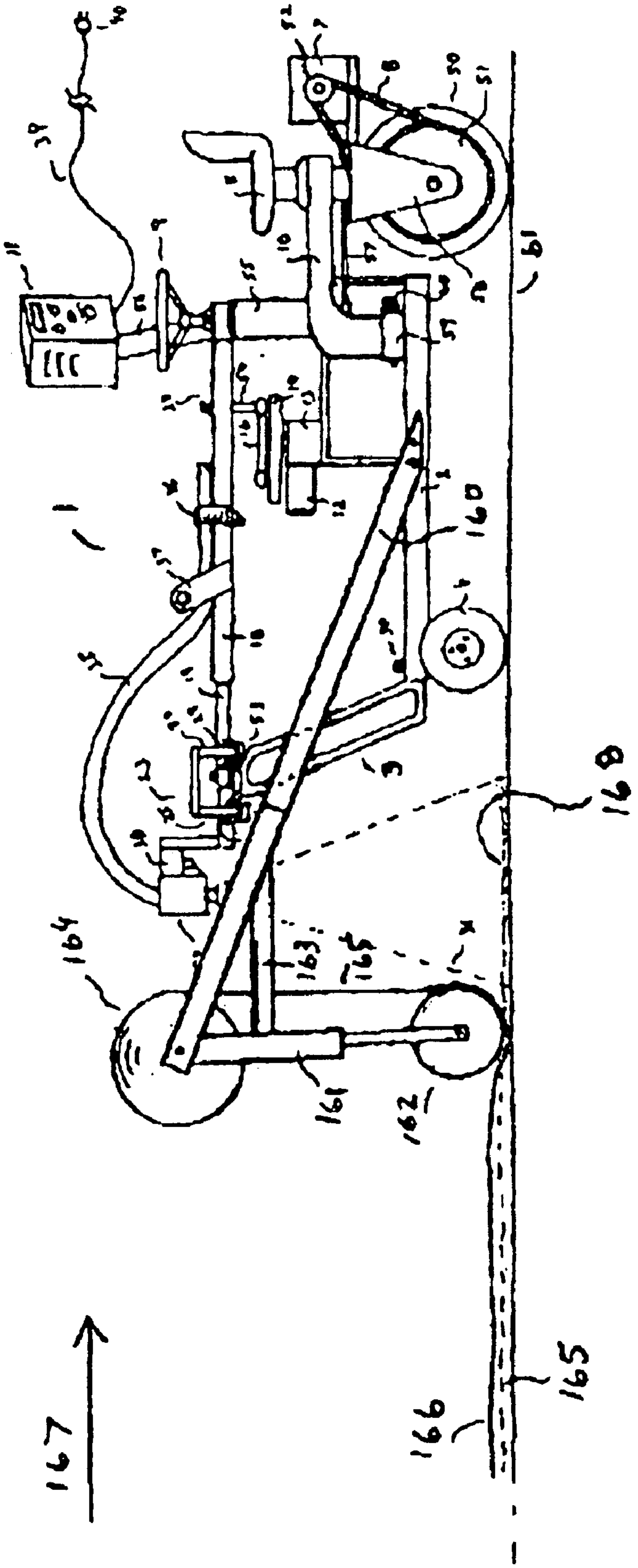

FIG. 11 shows modifications of the spraying applicator vehicle 1 for accomplishing this task. Side arms 160 are rigidly attached to frame 2 and uprights 3; they flare out at the distal end to lie outside of the spray pattern on each side. Roll 164 of lightweight reinforcing fabric is pivotly attached at the end of arms 160. The free end of fabric 165 is fed under light roller 162, which contacts surface 61 just at the edge of the foam adhesive spray pattern. Spring plunger 161 supported by brace 163 forces roller 162 into contact with roof surface 61. Foam spray 168, prior to rising, is contacted with fabric 165, which rises with foam 166 to embed itself in the foam layer as shown by the broken line.

It is further noted that other modifications may be made to the present invention without departing from the scope as noted in the appended claims.

I claim:

1. A method of making an in situ, filed applied surface membrane upon a roof surface comprising the steps of:

applying by a spray a first layer of spontaneously rising and curable polyurethane foam upon a roof surface;

during said spontaneously rising and curing of said polyurethane foam, applying a second layer of a reinforced open mesh layer having fibers therein over said polyurethane foam;

permitting said polyurethane foam to rise through and over said fibers of said reinforced open mesh layer, thereby imbedding said mesh therebetween;

applying a coating over said first and second layers; and, allowing said curable polyurethane foam to cure into a hardened state and become inseparable and monolithic.

2. The method of making an in situ, filed applied surface membrane upon a roof surface as in claim 1 further comprising the step of applying said reinforced open mesh layer from a continuous roll, wherein a free end of said second layer of reinforced open mesh is fed from said continuous roll under a rotating roller which contacts an upper portion of said spray applied first layer of spontaneously rising and curable polyurethane foam upon said roof surface.

* * * * *